Jan. 21, 1958  F. O. HESS  2,820,621
ROD HEATING MACHINE
Filed May 20, 1953  2 Sheets-Sheet 1
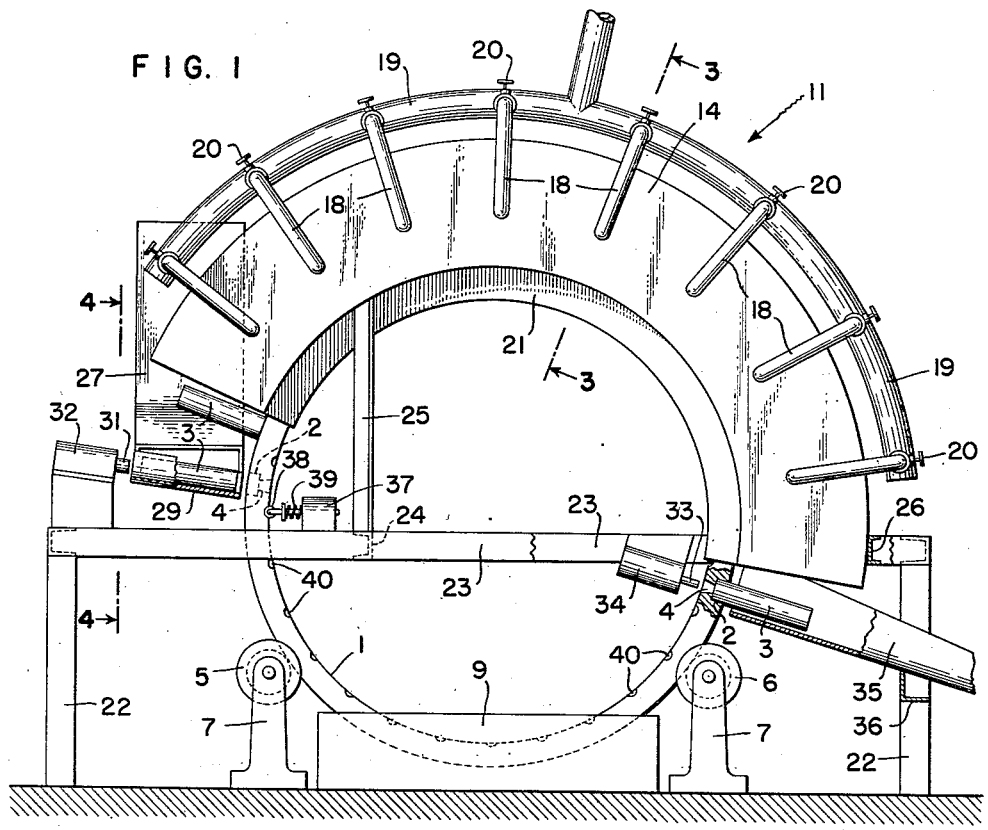
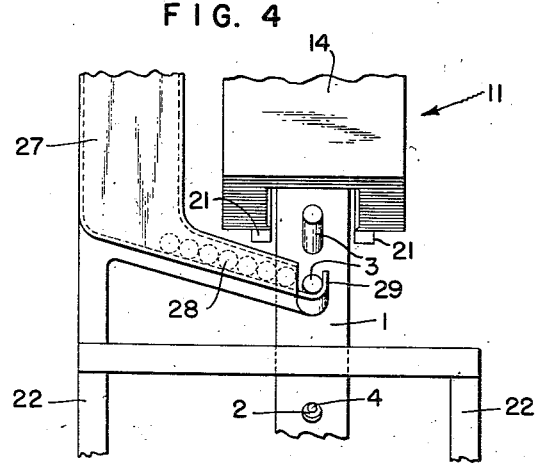
INVENTOR.
FREDERIC O. HESS
BY
ATTORNEY.

Jan. 21, 1958 F. O. HESS 2,820,621
ROD HEATING MACHINE
Filed May 20, 1953 2 Sheets-Sheet 2
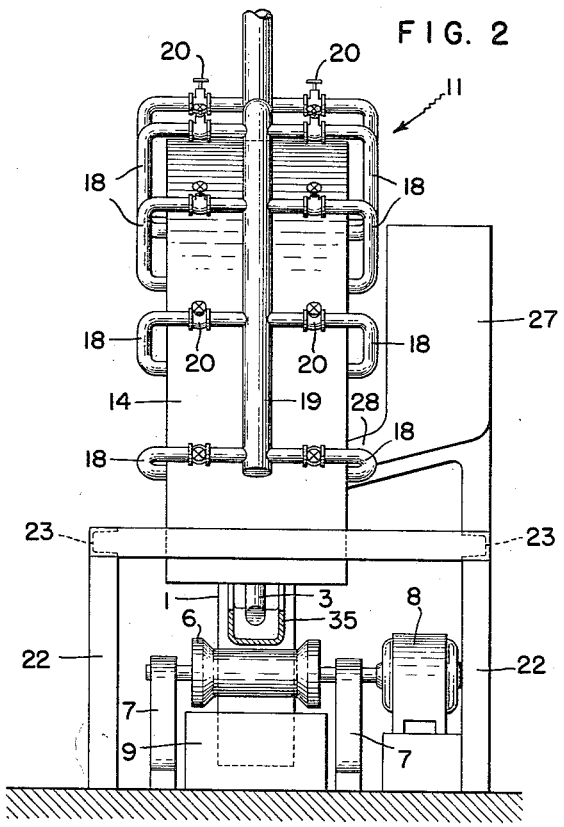
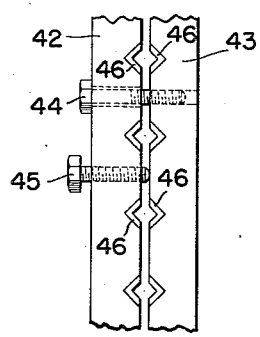
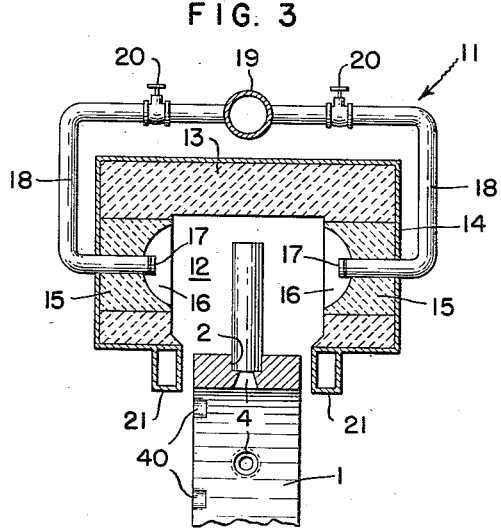
INVENTOR.
FREDERIC O. HESS
BY
ATTORNEY.

United States Patent Office 2,820,621
Patented Jan. 21, 1958

2,820,621

ROD HEATING MACHINE

Frederic O. Hess, Philadelphia, Pa., assignor to Selas Corporation of America, a corporation of Pennsylvania Application May 20, 1953, Serial No. 356,123

10 Claims. (Cl. 263—7)

The present invention relates to the heating of metal stock, and more particularly to a machine for heating the ends of short metal bars for forging or other hot metal working operations.

It is an object of the invention to provide a machine for heating the ends of short bars, one after the other, to the same predetermined temperature. It is a further object of the invention to provide a bar heating machine in which the bars are supplied to and delivered from the machine automatically.

In practicing the invention, there is provided a carrier upon which the bars are placed. The carrier is so mounted with respect to a furnace chamber that as the bars are moved from a loading position to a discharge position they are carried through the furnace and heated. Means is provided to supply the cold bars to and remove the hot bars from the carrier automatically and to control the movement of the carrier, and therefore the heating time of the bars.

The various features of novelty which characterizes my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a side view partly in section showing the apparatus;

Figure 2 is a view taken from the right of Figure 1;

Figure 3 is a view taken on line 3—3 of Figure 1;

Figure 4 is a view taken on line 4—4 of Figure 1; and

Figure 5 is a view of a modified type of work carrier.

Referring to the drawings, there is shown a carrier 1 which is in the form of a large ring. This ring is provided with a plurality of openings or sockets 2 in which the work 3 is received and from which the work extends outwardly in a radial direction as it is being moved by the carrier from a loading point to a discharge point. There is provided a slightly flared opening 4, smaller in diameter than socket 2, which extends from the interior of the carrier ring into the base of each socket. The carrier 1 is mounted for rotation around a horizontal axis by means of flanged rollers 5 and 6 which are in turn journalled for rotation in suitable supports 7. Rotation is imparted to roller 6, in order to rotate the carrier 1, by means of a motor 8 or similar apparatus which can be driven either intermittently or continuously as explained below. It is noted that a portion of the carrier extending between rollers 5 and 6 passes through a cooling tank 9.

The upper portion of the carrier and the work mounted thereon move through an arcuate shaped furnace 11 that extends through substantially 180° between the loading and the discharge points. This furnace includes an elongated furnace chamber 12 that surrounds the work projected from the carrier. The furnace is constructed of refractory material 13 and is backed up by sheet metal 14 in accordance with normal furnace practice. Heat for the furnace is provided by a plurality of burners 15 located at spaced points along the opposite side walls of the furnace structure. These burners are preferably of the type disclosed in Hess Patent 2,215,079, issued September 17, 1940. The burners each include a refractory ceramic block that is provided on its face with a cup-shaped depression 16. Extending into the base of the depression is a distributor member 17 from which a plurality of streams of combustible fuel mixture are discharged in a radial direction. These streams of combustible mixture are ignited and burn along the surface of the depression to heat it to incandescence. Radiant heat which is supplemented by convection heat from the hot products of combustion is thereby transmitted to the furnace in order to heat the work. The distributor members of each burner are supplied with fuel through pipes 18, that are connected with a manifold 19, from a source of combustible mixture of gas and air supplied under pressure. If desired, there may be provided a valve 20 in each of the fuel lines 18 so that the heat produced by each burner may be adjusted individually. The lower edges of the furnace adjacent to the edge of the carrier 1, as is best shown in Figure 3, are provided with water cooled chamber 21 to help protect the carrier from the intense heat generated in the furnace chamber.

There is provided a framework to support the furnace in position above the carrier. This framework includes upright members 22 and horizontal members 23. The furnace itself is supported at its left end on the frame by means of a cross piece 24 and vertical members 25 which are suitably attached to the metal shell of the furnace. The right end of the furnace is supported on the framework by means of a horizontal channel member 26 also suitably attached to the members 23 of the frame and the shell 14 of the furnace.

A supply of the rods to be heated is kept in a hopper 27 that is also mounted on the framework and slightly to one side of the furnace and carrier as is best shown in Figures 1 and 2. The lower portion of the hopper is formed as a spout which extends to the right in Figure 4 and through which the rods are fed one at a time. The mouth of the spout is provided with a trough 29 the end of which toward the carrier is depressed slightly so that the rod laying in this trough will be radially disposed with respect to the carrier. The rods are moved axially into the carrier as the carrier is rotated to a position in which the sockets 2 are aligned with the rod held in the trough 29. This movement is accomplished by means of a plunger 31 that is actuated by a solenoid 32 which is mounted on a suitable support on the frame.

The rods are moved by the carrier from the loading point through the furnace to an unloading point where they are moved axially from the carrier. The rods are removed from the carrier by means of a plunger 33 that is mounted to move axially through the opening 4. The plunger is actuated by a solenoid 34 that is mounted on the frame 23. As the rods are moved from the carrier, they are received by a chute 35 which will direct them to a forging press or other point of use. This chute is supported on the framework as by an angle iron indicated at 36.

The loading and unloading solenoids 32 and 34 are energized to move their respective plungers intermittently when the sockets 2 are positioned properly with respect to the loading chute and unloading chute. This actuation is accomplished through a conventional electric circuit by the closing of a switch 37. As is shown herein, the switch is closed periodically as the sockets 2 of the carrier move to a position in which they are axially aligned with the supply of rods. The switch is closed by means of a plunger which has a roller 38 on its outer end and which roller is biased by a spring 39 into engagement with the inner periphery of the carrier. The carrier is provided on its inner surface with a plurality of notches or depressions 40 so located with respect to the roller that the roller 38 will move into a notch 40 to close the switch when one of the sockets is aligned with a rod on the trough 29. At the same time, the solenoid 32 is energized to move a rod into the socket on the carrier, the solenoid 34 is energized to remove a heated rod from the carrier. As noted above, the electrical circuits by means of which these solenoids can be energized when switch 37 is closed are of a conventional type.

In the description above, the carrier is provided with sockets 2 that are designed to receive only a single sized rod. If desired, however, the carrier can be modified as shown in Figure 5 so that rods of different diameters may be heated. In this case, the carrier consists of a pair of complementary rings 42 and 43 mounted on the rollers 5 and 6 for rotation together. These rings are fastened together at a predetermined distance apart by means of a plurality of sets of bolts 44 and 45. Each bolt 44 passes through an opening in the ring 42 and is threaded into the ring 43. Each bolt 44 is threaded through the ring 42 with its end bearing against the ring 43. It will be obvious that by properly adjusting the bolts 44 and 45, the rings can be spaced at different predetermined distances apart. Each ring is provided with a series of notches 46 that cooperate to form sockets in which the work is received. Proper adjustment of the bolts will vary the size of the sockets so that rods of different sizes may be received and be heated.

In the operation of the machine, the motor 8 is energized to drive roller 6 and thereby rotate the carrier ring 1. If desired, of course, the exterior surface of the ring and the surface of the roller may be roughened or supplied with teeth so that the drive is positive rather than by friction, although friction is considered sufficient to rotate the carrier under normal circumstances. As the carrier is rotated, the notches or depressions 40 will periodically move under the roller 38 of the switch actuating plunger. When this occurs, switch 37 is closed to energize solenoid 32 so that plunger 31 will move a rod axially into the socket 2 which is then positioned in alignment with the rod. Simultaneously, solenoid 34 is energized so that a heated rod is moved by plunger 33 out of the carrier and down the trough 35 to a point of use. As the carrier is rotated, the rods mounted thereon and extending in a radial direction therefrom are moved through the furnace chamber to be brought up to temperature. In an operation of this type, the heating is on a time temperature basis. The furnace is maintained at a given temperature and the carrier is moved at a given speed. The rods will therefore be kept in the furnace a predetermined time and will be heated to a predetermined temperature. The time and temperature will, of course, vary with the size and composition of the rods. For example, a steel rod one inch in diameter can be heated to a forging temperature of 2250° F. in a furnace having a chamber temperature of 2450° F. in three minutes. For non-ferrous metals where the forging temperature is lower, the heating time is correspondingly shorter. As the carrier rotates, it is moved continuously through a cooling bath in the tank 9 so that it will always be at a low temperature when the rods are placed thereon and the temperature of the carrier need not be taken into account when computing the heating rate of the rods carried thereby. In addition, the cooling of the carrier prevents deterioration thereof.

In the description above, it has been assumed that the carrier is rotating continuously. It will be obvious that suitable electric circuits can be used which perform in a conventional manner to move the carrier in steps so that the carrier is stationary when a new rod is being inserted into a socket thereof and a heated rod is being removed therefrom. It will also be obvious that the actuating members 32 and 34 can be pneumatic cylinders, for example, rather than solenoids. To make this change, it is only necessary that the switch 37 operate solenoid valves in the air supply lines for the pneumatic cylinders. The equivalency of solenoids and pneumatic cylinders for this purpose is well known in the art.

From the above description, it will be seen that I have provided a simple machine for heating the ends of rods. This machine is automatically loaded and unloaded in response to the position of the carrier and the work is moved through a furnace, while each piece of work is held in the furnace for exactly the same predetermined time. This insures that each piece of work will be heated in exactly the same manner as each other piece of work. The feature of uniform heating is of the greatest importance in a modern heat treating and forging plant.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. Apparatus for heating rod ends comprising a ring shaped carrier, means to mount said carrier on edge comprising a pair of rollers, means to drive one of said rollers and thereby rotate said carrier, said carrier being provided with a plurality of radially extending sockets on its periphery and in each of which the end of a rod is snugly received, means located adjacent to the carrier to hold a supply of rods, means to load rods individually into said sockets in a radial direction, means located within said carrier and spaced substantially diametrically from said loading means to unload rods in a radial direction from said sockets, and a stationary furnace surrounding said carrier between said loading and unloading means to heat said rods as they are moved by said carrier between the loading and unloading positions.

2. In apparatus for heating rods, the combination of a ring shaped carrier, means to mount said carrier on edge and for rotation around a horizontal axis, a stationary furnace structure extending in an arc about the upper portion of said carrier, said carrier passing through a loading station adjacent to the entrance of said furnace and through a discharge station adjacent to the exist of said furnace, said carrier being provided on its outer surface with a plurality of means to hold the ends of bars to be heated whereby the bars will project radially outwardly therefrom, means at said loading station to move rods axially into said holding means, means at said discharge station to remove rods axially from said holding means, and mechanism operated in accordance with the position of said carrier to actuate said two moving means simultaneously.

3. Apparatus for heating rod ends comprising an annular carrier, means to mount said carrier on edge and rotate it around a horizontal axis, said carrier being provided with a plurality of sockets extending through its periphery in each of which the end of a rod is snugly received with the rod projecting radially from the carrier, an arcuate furnace extending around a portion of the periphery of the carrier and through which the rods move to be heated, means located adjacent to the entrance of said furnace and outside of said carrier to move rods in a radial direction into said sockets, means located adjacent to the exit of said furnace and within said carrier to move rods in a radial direction from said sockets, and means to operate said two moving means as said sockets are moved to a predetermined position with respect to said two moving means.

4. Apparatus for heating bars comprising in combination, a ring shaped carrier provided with a plurality of radially directed sockets on its peripheral surface, means to mount said carrier on edge and rotate it around a horizontal axis, an elongated arcuate furnace having a slot in the concave side thereof and at each end, means to mount said furnace over said carrier with the periphery of the carrier received in the slot in said furnace, means adjacent to one end of said furnace to move bars to be heated in a radial direction into said sockets, means adjacent to the exit end of said furnace to move bars in a radial direction from said sockets, the bars projecting radially from said sockets moving through the end slots into and out of the furnace as said carrier is rotated, means to synchronize the operation of said two moving means, and means to cool a portion of said carrier that is not in the slot of said furnace.

5. Apparatus for heating the ends of bars comprising a ring shaped carrier provided with a plurality of holding means spaced around its periphery, means to mount said carrier on edge and rotate it around a horizontal axis, a hopper for a supply of bars to be heated arranged to hold the bars radially with respect to said carrier, a plunger located outside the periphery of said carrier to move bars axially from said hopper into said holding means from which they project in a radial direction, second plunger means located within said carrier to move bars in an axial direction from said holding means, means responsive to the rotative position of said carrier, mechanism operative by said responsive means to actuate said two plunger means, said two plunger means being spaced apart circumferentially of said carrier, and means located adjacent to the periphery of said carrier to heat the radially projecting ends of said bars as they are moved by said carrier between said two plunger means.

6. Apparatus for heating bars comprising a ring shaped carrier, means to mount said carrier for rotation around an axis, said carrier being provided with means on the outside of its periphery to hold bars with an end projecting radially therefrom, means located adjacent to the periphery of said carrier to support a bar with its axis radial to said carrier, a first plunger to move said bar from said supporting means in a radial direction into said holding means, a second plunger spaced around said carrier from said first plunger to move bars out of said holding means in a direction radial thereto, means responsive to the position of said carrier, mechanism operated by said responsive means to actuate said plungers to move bars into and out of said holding means, and means located adjacent to the periphery of said carrier to heat said bars as they move with said carrier between the location of said first and second plungers.

7. The combination of claim 6 including solenoids to operate said plungers and in which said mechanism includes a switch to energize said solenoids.

8. The combination of claim 6 in which said carrier is provided with a notch on its surface in a predetermined position with respect to each of said holding means, said responsive means including a spring pressed plunger, and means to mount said responsive means so that the plunger will bear against the surface of said carrier and move into said notches when one of said holding means is aligned with one of said plungers, said mechanism being operated upon movement of said roller into one of said notches.

9. The combination of claim 6 in which said means to heat includes an elongated arcuate furnace, said furnace being provided with a slot through which said bars may move to be heated, and means to mount said furnace adjacent to said carrier so that the bars thereon may move through said slot as said carrier is rotated.

10. Apparatus for heating bars and the like comprising in combination, an annular carrier provided with a plurality of radially directed work holding means on its outer peripheral surface, means to mount said carrier on edge and rotate it around a horizontal axis, and an elongated arcuate furnace having a slot in the concave side thereof and at each end, means to mount said furnace in a fixed position over said carrier with the periphery of the carrier received in the slot of the furnace, means adjacent to one end of the furnace to move work to be heated in a radial direction into said holding means, and means adjacent to the exit of the furnace to move heated work in a radial direction from said holding means, the work projecting radially from said carrier moving through said end slots into and out of said furnace as said carirer is rotated.

References Cited in the file of this patent

UNITED STATES PATENTS

| | | |
|---|---|---|
| 1,412,152 | Walpole | Apr. 11, 1922 |
| 1,474,705 | Bluemel | Nov. 20, 1923 |
| 2,053,652 | Blanchard et al. | Sept. 8, 1936 |
| 2,182,294 | Kuhnle | Dec. 5, 1939 |
| 2,622,861 | Talley | Dec. 23, 1952 |

FOREIGN PATENTS

| | | |
|---|---|---|
| 684,285 | Germany | Nov. 29, 1939 |
| 613,632 | Germany | May 23, 1935 |